US007096236B2

(12) United States Patent
Good et al.

(10) Patent No.: US 7,096,236 B2
(45) Date of Patent: Aug. 22, 2006

(54) CHANGE SEQUENCE NUMBER GENERATOR

(75) Inventors: Gordon Good, Mountain View, CA (US); John Merrells, Mountain View, CA (US); Ludivoc Poitou, Crolles (FR); Olga Natkovich, Sunnyvale, CA (US); Mark C. Smith, Saline, MI (US); Pinaki Shah, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 538 days.

(21) Appl. No.: 09/993,939

(22) Filed: Nov. 6, 2001

(65) Prior Publication Data

US 2003/0088589 A1  May 8, 2003

(51) Int. Cl.
*G06F 12/00* (2006.01)
(52) U.S. Cl. .................. 707/203; 707/10; 707/100
(58) Field of Classification Search .............. 707/1, 707/3, 8, 10, 100, 102, 104.1, 200, 201, 203, 707/204; 709/200–203, 217–219, 230; 705/1, 705/14, 26, 27
See application file for complete search history.

(56) References Cited

U.S. PATENT DOCUMENTS

| | | | | |
|---|---|---|---|---|
| 5,581,753 A | * | 12/1996 | Terry et al. | 707/201 |
| 5,805,822 A | * | 9/1998 | Long et al. | 709/232 |
| 5,835,757 A | * | 11/1998 | Oulid-Aissa et al. | 707/10 |
| 5,892,910 A | * | 4/1999 | Safadi | 709/217 |
| 6,185,575 B1 | * | 2/2001 | Orcutt | 707/200 |
| 6,567,892 B1 | * | 5/2003 | Horst et al. | 711/114 |
| 6,606,744 B1 | * | 8/2003 | Mikurak | 717/174 |

OTHER PUBLICATIONS

Ellen Stokes and Gordon Good, "The LDUP Replication Update Protocol", Jul. 15, 2000, <www.ietf.org/proceedings/00dec/1-D/draft-ietf-ldup-protocol-02.txt>, pp. 1-16.*
Netscape Communications Corporation; "Chapter 12—Managing Replication"; Administrator's Guide—Netscape Directory Server, Version 4.0; 1998; pp. 299-328; Netscape Communications Corporation, Mountain View CA, USA.
Netscape Communications Corporation; "Chapter 7—Planning Replication"; Deployment Guide—Netscape Directory Server, Version 4.0; 1998; pp. 93-115; Netscape Communications Corporation, Mountain View CA, USA.
Douglas B. Terry, Karin Petersen, Mike J. Spreitzer, and Marvin M. Theimer; "The Case for Non-transparent Replication: Examples from Bayou"; pp. 1-10; Computer Science Laboratory, Xerox Palo Alto Research Center, Palo Alto, CA; USA.
Ed Reed, Ellen Stokes, and Russel Weiser; "LDAP Replication Architecture"; www.stanford.edu/hodges . . . ; Apr. 17, 1998; pp. 1-11; The Internet Society; California; USA.

* cited by examiner

*Primary Examiner*—Greta Robinson
*Assistant Examiner*—Harold E. Dodds, Jr.
(74) *Attorney, Agent, or Firm*—Osha * Liang LLP

(57) ABSTRACT

A directory server including a supplier server, a consumer server in communication with the supplier server, a plurality of pluggable services that manage replication of data contained within the directory server from the supplier server to the consumer server, and a change sequence number used to determine ordering of operations performed on the consumer server. Replication of data is managed using the change sequence number.

15 Claims, 6 Drawing Sheets

Entry 124

| Attribute Types 120 | Attribute Values 122 |
|---|---|
| cn: | Barbara Jensen<br>Babs Jensen |
| sn: | Jensen |
| telephonenumber: | +1 408 555 1212 |
| mail: | babs@airius.com |

*(PRIOR ART)*
*FIGURE 4*

CHANGE SEQUENCE NUMBER GENERATOR

BACKGROUND OF INVENTION

The most fundamental program resident on any computer is the operating system (OS). Various operating systems exist in the market place, including Solaris™ from Sun Microsystems Inc., Palo Alto, Calif. (Sun Microsystems), MacOS from Apple Computer, Inc., Cupertino, Calif., Windows® 95/98 and Windows NT®, from Microsoft Corporation, Redmond, Wash., UNIX, and Linux. The combination of an OS and its underlying hardware is referred to herein as a "traditional platform". Prior to the popularity of the Internet, software developers wrote programs specifically designed for individual traditional platforms with a single set of system calls and, later, application program interfaces (APIs). Thus, a program written for one platform could not be run on another. However, the advent of the Internet made cross-platform compatibility a necessity and a broader definition of a platform has emerged. Today, the original definition of a traditional platform (OS/hardware) dwells at the lower layers of what is commonly termed a "stack," referring to the successive layers of software required to operate in the environment presented by the Internet and World Wide Web.

Effective programming at the application level requires the platform concept to be extended all the way up the stack, including all the new elements introduced by the Internet. Such an extension allows application programmers to operate in a stable, consistent environment.

iPlanet™ E-commerce Solutions, a Sun Microsystems|Netscape Alliance, has developed a net-enabling platform shown in FIG. 1 called the Internet Service Deployment Platform (ISDP) (28). ISDP (28) gives businesses a very broad, evolving, and standards-based foundation upon which to build an e-enabled solution.

A core component of the ISDP (28) is iPlanet™ Directory Server (80), a Lightweight Directory Access Protocol (LDAP)-based solution that can handle more than 5,000 queries per second. iPlanet™ Directory Server (iDS) provides a centralized directory service for an intranet or extranet while integrating with existing systems. The term "directory service" refers to a collection of software, hardware, and processes that store information and make the information available to users. The directory service generally includes at least one instance of the iDS and one or more directory client program(s). Client programs can access names, phone numbers, addresses, and other data stored in the directory.

The iDS is a general-purpose directory that stores all information in a single, network-accessible repository. The iDS provides a standard protocol and application programming interface (API) to access the information contained by the iDS. The iDS provides global directory services, meaning that information is provided to a wide variety of applications. Until recently, many applications came bundled with a proprietary database. While a proprietary database can be convenient if only one application is used, multiple databases become an administrative burden if the databases manage the same information. For example, in a network that supports three different proprietary e-mail systems where each system has a proprietary directory service, if a user changes passwords in one directory, the changes are not automatically replicated in the other directories. Managing multiple instances of the same information results in increased hardware and personnel costs.

The global directory service provides a single, centralized repository of directory information that any application can access. However, giving a wide variety of applications access to the directory requires a network-based means of communicating between the numerous applications and the single directory. The iDS uses LDAP to give applications access to the global directory service.

LDAP is the Internet standard for directory lookups, just as the Simple Mail Transfer Protocol (SMTP) is the Internet standard for delivering e-mail and the Hypertext Transfer Protocol (HTTP) is the Internet standard for delivering documents. Technically, LDAP is defined as an on-the-wire bit protocol (similar to HTTP) that runs over Transmission Control Protocol/Internet Protocol (TCP/IP). LDAP creates a standard way for applications to request and manage directory information.

An LDAP-compliant directory, such as the iDS, leverages a single, master directory that owns all user, group, and access control information. The directory is hierarchical, not relational, and is optimized for reading, reliability, and scalability. This directory becomes the specialized, central repository that contains information about objects and provides user, group, and access control information to all applications on the network. For example, the directory can be used to provide information technology managers with a list of all the hardware and software assets in a widely spanning enterprise. Most importantly, a directory server provides resources that all applications can use, and aids in the integration of these applications that have previously functioned as stand-alone systems. Instead of creating an account for each user in each system the user needs to access, a single directory entry is created for the user in the LDAP directory. FIG. 2 shows a portion of a typical directory with different entries corresponding to real-world objects. The directory depicts an organization entry (90) with the attribute type of domain component (dc), an organizational unit entry (92) with the attribute type of organizational unit (ou), a server application entry (94) with the attribute type of common name (cn), and a person entry (96) with the attribute type of user ID (uid). All entries are connected by the directory.

Understanding how LDAP works starts with a discussion of an LDAP protocol. The LDAP protocol is a message-oriented protocol. The client constructs an LDAP message containing a request and sends the message to the server. The server processes the request and sends a result, or results, back to the client as a series of LDAP messages. Referring to FIG. 3, when an LDAP client (100) searches the directory for a specific entry, the client (100) constructs an LDAP search request message and sends the message to the LDAP server (102) (step 104). The LDAP server (102) retrieves the entry from the database and sends the entry to the client (100) in an LDAP message (step 106). A result code is also returned to the client (100) in a separate LDAP message (step 108).

LDAP-compliant directory servers like the iDS have nine basic protocol operations, which can be divided into three categories. The first category is interrogation operations, which include search and compare operators. These interrogation operations allow questions to be asked of the directory. The LDAP search operation is used to search the directory for entries and retrieve individual directory entries. No separate LDAP read operation exists. The second category is update operations, which include add, delete, modify, and modify distinguished name (DN), i.e., rename, operators. A DN is a unique, unambiguous name of an entry in LDAP. These update operations allow the update of information in the directory. The third category is authentication and control operations, which include bind, unbind, and abandon operators.

The bind operator allows a client to identify itself to the directory by providing an identity and authentication credentials. The DN and a set of credentials are sent by the client to the directory. The server checks whether the credentials are correct for the given DN and, if the credentials are correct, notes that the client is authenticated as long as the connection remains open or until the client re-authenticates. The unbind operation allows a client to terminate a session. When the client issues an unbind operation, the server discards any authentication information associated with the client connection, terminates any outstanding LDAP operations, and disconnects from the client, thus closing the TCP connection. The abandon operation allows a client to indicate that the result of an operation previously submitted is no longer of interest. Upon receiving an abandon request, the server terminates processing of the operation that corresponds to the message ID.

In addition to the three main groups of operations, the LDAP protocol defines a framework for adding new operations to the protocol via LDAP extended operations. Extended operations allow the protocol to be extended in an orderly manner to meet new marketplace needs as they emerge.

The basic unit of information in the LDAP directory is an entry, a collection of information about an object. Entries are composed of a set of attributes, each of which describes one particular trait of an object. Attributes are composed of an attribute type (e.g., common name (cn), surname (sn), etc.) and one or more values. FIG. 4 shows an exemplary entry (124) showing attribute types (120) and values (122). Attributes may have constraints that limit the type and length of data placed in attribute values (122). A directory schema places restrictions on the attribute types (120) that must be, or are allowed to be, contained in the entry (124).

SUMMARY OF INVENTION

In general, in one aspect, the invention involves a directory server. The directory server comprises a supplier server, a consumer server in communication with the supplier server, a plurality of pluggable services that manage replication of data contained within the directory server from the supplier server to the consumer server, and a change sequence number used to determine ordering of operations performed on the consumer server. Replication of data is managed using the change sequence number.

In general, in one aspect, the invention involves method of generating a change sequence number. The method comprises initializing the change sequence number, retrieving a timestamp portion, retrieving a sequence number portion, retrieving a replica identifier portion, and retrieving a sub-sequence number portion. The timestamp portion, the sequence portion, the replica identifier portion, and the sub-sequence portion are joined into a tuple that forms the change sequence number.

In general, in one aspect, the invention involves an apparatus for generating a change sequence number. The apparatus comprises means for initializing the change sequence number, means for retrieving a timestamp portion, means for retrieving a sequence number portion, means for retrieving a replica identifier portion, means for retrieving a sub-sequence number portion, and means for joining the timestamp portion, the sequence portion, the replica identifier portion, and the sub-sequence portion into a tuple that forms the change sequence number.

Other aspects and advantages of the invention will be apparent from the following description and the appended claims.

BRIEF DESCRIPTION OF DRAWINGS

FIG. 4 illustrates a directory entry showing attribute types and values.

DETAILED DESCRIPTION

Figure 1:
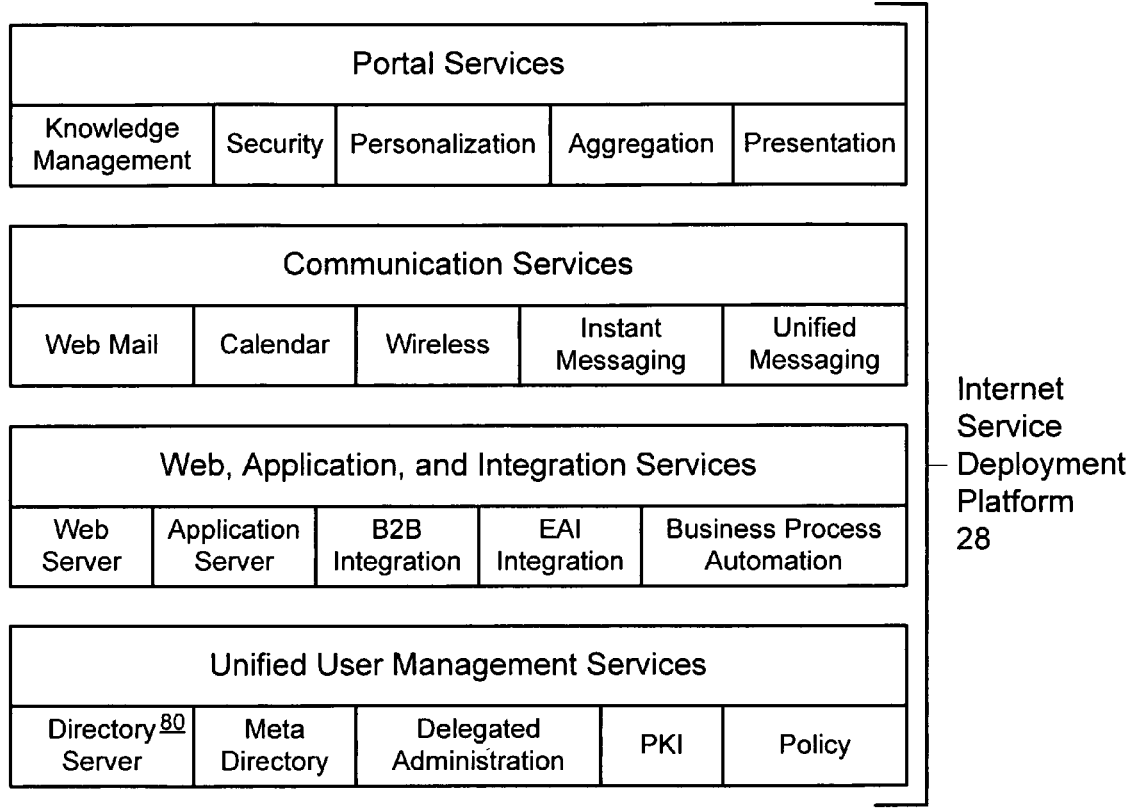
FIG. 1 illustrates a block diagram of iPlanet™ Internet Service Development Platform.
Figure 2:
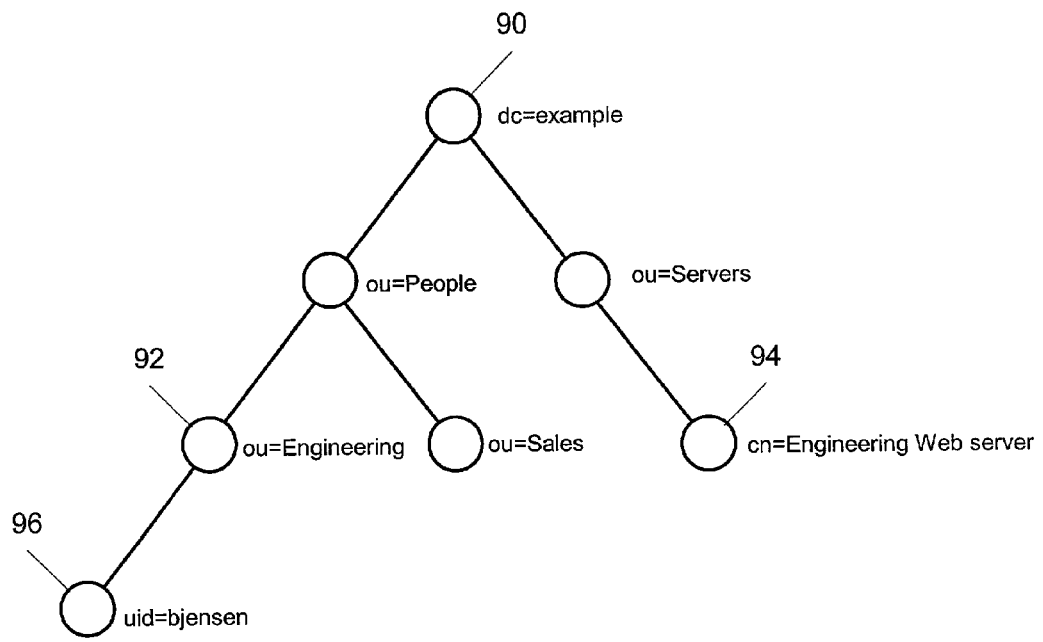
FIG. 2 illustrates part of a typical directory.
Figure 3:
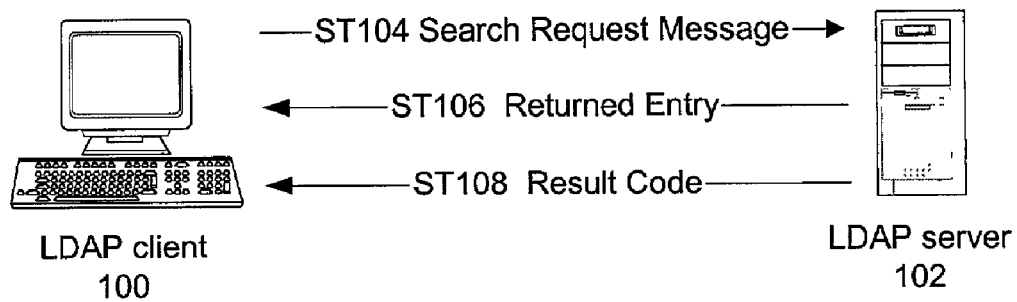
FIG. 3 illustrates the LDAP protocol used for a simple request.

Specific embodiments of the invention will now be described in detail with reference to the accompanying figures. Like elements in the various figures are denoted by like reference numerals for consistency.

Figure 5:
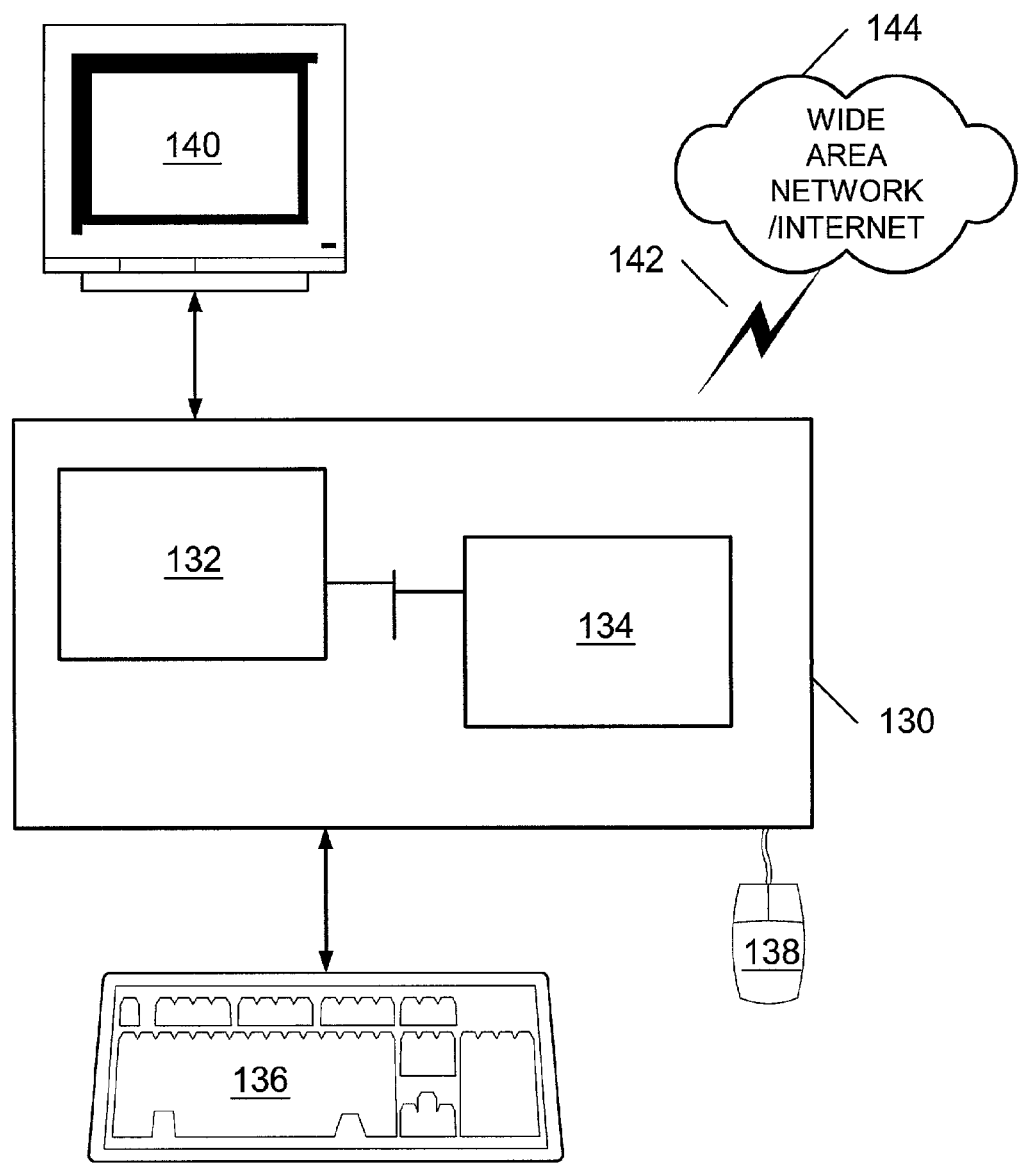
FIG. 5 illustrates a typical computer with components.

The invention described here may be implemented on virtually any type computer regardless of the traditional platform being used. For example, as shown in FIG. 5, a typical computer (130) has a processor (132), memory (134), among others. The computer (130) has associated therewith input means such as a keyboard (136) and a mouse (138), although in an accessible environment these input means may take other forms. The computer (130) is also associated with an output device such as a display (140), which also may take a different form in a given accessible environment. The computer (130) is connected via a connection means (142) to a wide area network (144), such as the Internet.

The present invention involves a Change Sequence Number (CSN) Generator 159. A change sequence number is a tuple {T, S, r, s} where: T is a 32-bit timestamp (UNIX ctime), S is a sequence number, used to provide finer granularity than T (16 bits), r is a 16-bit replica ID, and s is a sub-sequence number, used to order operations within a single LDAP operation (16 bits).

In a multi-mastered environment, client updates may occur at any one of the mastering servers. These updates have to be eventually relayed to all other replicas. Each server maintains a list of updates that have been applied to the local copy of the Directory Information Tree (DIT). When one server receives updates from another server, the amount of data transferred can be reduced by sending only the updates which the receiver hasn't already seen. Replica Update Vectors (RUVs) encode this information regarding what updates have been received by each replica. RUVs are exchanged by the servers at the beginning of a replication session to convey information regarding the updates that are known to the replicas.

Figure 6:
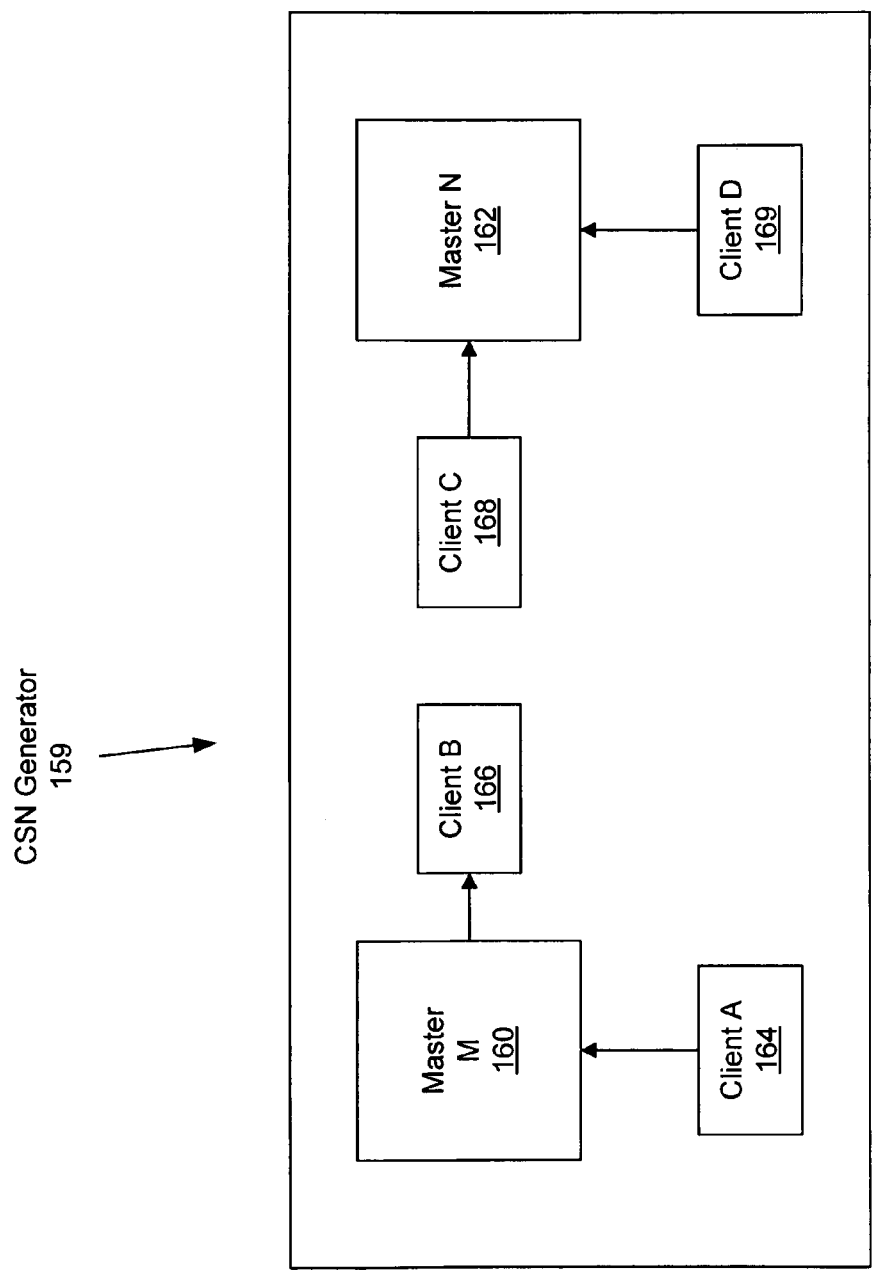
FIG. 6 illustrates a block diagram of the CSN Generator in one or more embodiments of the present invention.

This process is represented in FIG. 6. Masters M (160), N (162), O (164), and P (166) have clients A (168), B (170), C (172), D (174), E (176), F (178), G (180), and H (182). Assume the following facts. All clients have a replica of the same data, and client A (168) modifies the contents of an entry at master M (160). Around the same time, client B (170) modifies the same entry at master N (162). At some later point in time, all the masters and all the replicas attempt to reconcile the changes in the directory contents. An Update Resolution Procedure (URP) algorithm is then used to determine the correct ordering of various operations. The URP is the process by which update conflicts are detected and resolved. The update resolution policy of the URP determines the method used to resolve update conflicts. Consistent application of the same URP across all cooperating servers guarantees that the system eventually reaches a consistent state, in which all servers contain the same data.

The URP algorithm uses CSNs to determine the ordering of the operations. In a distributed environment, such as multi-mastered replication, CSNs provide a sense of global logical time and hence a basis for ordering operations which have been initially performed at different servers. The CSNs are assigned to update (add/modify/delete) operations at a replica and are communicated to other replicas via exchange of RUVs. An RUV describes how up-to-date one replica is with respect to all other replicas. Conceptually, RUVs involve a series of CSNs, one for each known replica, and describes the latest update received from that replica. When one replica sends changes to another, the replica consults the consumer's RUV and determines the smallest set of updates that need to be sent to bring the replica up to date.

The CSN Generator API can be used to obtain a meaningful comparison of string representations. Depending on the need for readability, the different components are separated by hyphens; for a 64 bit CSN, readability may not be an issue, but knocking off a few hyphens saves upwards of 10% in space needed to represent a CSN. An example of a string representation of a CSN is "03626325e0001a1a1". Because the first character of the above string is '0', the timestamp portion is ahead of the sequence number and the replica ID. In the above string, "3626325 e" is the timestamp part of the CSN. It is actually the clock time representing "Thu Oct 15 10:35:26 1998 PDT". Note that the timestamps denote the time in Universal Time Coordinated (UTC) format and no corrections are required for different time zones. The next four bytes of the string representation, i.e., "0001" is the sequence number portion of CSN. The last four bytes of the string representation ("a1a1") denote the replica ID of the server where the CSN was generated.

When an operation is received at a server, the server associates a CSN with that operation. The server maintains a changelog, which is used to record the changes to be replayed later to other servers as a sequence of change records. The changelog keeps track of all the CSNs that are assigned to operations and then order the operations accordingly. To avoid waiting indefinitely for aborted or failed operations, the changelog also needs to be notified when an assigned CSN is never going to be committed to the changelog. A csnRegisterNewCSNCb( ) function can be used by the changelog (or any other interested module) to register functions with the CSN generator. These functions are called whenever an operation is assigned a new CSN or the operation is aborted.

In one embodiment of the present invention, a correct implementation of the CSN generator should satisfy several conditions, including that a newly generated CSN is always greater than any other CSN generated locally, and that a newly generated CSN is greater than all known CSNs generated by other servers (obtained via exchange of RUVs or as part of the initial setup of a replication session). To guarantee these properties across server restarts, the highest known CSN should be maintained in stable storage. This can be achieved by simply writing the timestamp portion of the highest known CSN to a file. However, this is an expensive operation. Therefore, for the purpose of efficiency, this operation is performed at certain regular intervals and the timestamp so stored is a value in the future (just beyond the timestamp at the end of the next interval). The timestamp component of the CSN thus represents a logical time. This component is loosely based on the system clock time, and the sequence number provides further granularity.

To guarantee the above mentioned properties of CSNs, the timestamp component is represented by Logical Time= (System Clock Time)+(Local Offset)+(Network Offset). The System Clock Time component directly corresponds to the value returned by the time( ) system call. The Local Offset component is the correction added to the System Clock Time to ensure that a newly generated CSN is always greater than any other CSN generated locally. This component is necessary to handle the case when the system clock is set back by the system administrator. This component is initially zero and never decreases. The Network Offset component is the correction added to guarantee that a newly generated CSN is greater than all known CSNs generated by other servers. This component is incremented when it is noticed that the logical time on another server is ahead of the local logical time. This component is initially zero and never decreases. The system clock time component is sampled periodically (every one second) and cached by a separate thread.

This component is then available via a call to get_current_time( ). If the local system clock is not set back or slowed down (through NTP or other means), Local Offset is always zero. The increments to Network Offset are limited by the configuration parameter "csn_max_skew" (defaults to 1 hour). This parameter protects against large differences in logical times between various servers. Such large differences are usually indicative of some other problems and should be handled immediately. The CSN generator stores its state information in the entry "cn=csnGenerator, cn=config" in the DIT. The "csnstate" attribute stores the system clock time, the local offset, the network offset, and the sequence number. This information is then used to initialize the generator when the server is restarted. CSNs are assigned whenever an entry is created, modified, deleted, etc., by a client. Some of the state information stored in an entry can be purged from time to time. This purging helps reclaim some of the storage space.

The LDIF representation for CSNs for attributes uses attribute options. The attribute option encodes the type of CSN and the CSN value. For example, the update CSN for telephonenumber attribute is denoted as: telephonenumber; vucsn-XXX: 555-1212. A delete CSN is represented as: telephonenumber; vdcsn-XXX: 555-1212. The CSN representing the creation time of the entry can be represented as an attribute itself: dncsn: XXX. Also, deleted attributes can be represented as values of a multivalued attribute: deletedAttribute: attr1,adcsn-XXX; deletedAttribute: attr2,adcsn-XXX.

The storage representation is similar to the LDIF representation. Changes to str2entry and entry2str routines are required to store and read the CSN values. The str2entry routine is read in the LDIF representation and interprets the CSN related values. These values are then used to fill the CSN related information in the slapi_entry and slapi_attr structures. The entry2str routine outputs some additional CSN related information. This information is written as additional attribute values for an entry. The pseudocode for the routine follows. For an entry e, output the DN, and output the "DNCSN" as the attribute DNCSN with a value corresponding to the string representation of the CSN. Output the last modification CSN as the attribute lastModifiedCSN with a value corresponding to the string representation of the CSN. For each attribute value, output the attribute value with the format defined in the LDIF representation of attribute CSNs. Output deleted attributes, if any, with the format defined in the LDIF representation of CSNs for deleted attributes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A directory server comprising:
a supplier server;
a consumer server in communication with the supplier server;
a plurality of pluggable services that manage replication of data contained within the directory server from the supplier server to the consumer server; and
a change sequence number used to determine ordering of operations performed on the consumer server;
wherein the replication of data is managed using the change sequence number;
wherein the change sequence number is a tuple comprising a timestamp portion, a sequence number portion, a replica identifier portion, and a sub-sequence number portion, and wherein the timestamp portion comprises a network offset component, wherein the network offset component is incremented when a first logical time on the consumer server is greater than a second logical time on the supplier server.

2. The directory server of claim 1, wherein the highest value of the change sequence number is maintained in stable storage.

3. The directory server of claim 1, wherein the timestamp portion is represented by logical time and is thirty-two bits in length.

4. The directory server of claim 1, wherein the sequence number portion is generated by an incremental counter and is sixteen bits in length.

5. The directory server of claim 1, wherein the replica identifier portion denotes an identifier of the consumer server that generated the change sequence number and is sixteen bits in length.

6. The directory server of claim 1, wherein the sub-sequence number is used to order operations within a single operation and is sixteen bits in length.

7. The directory server of claim 1, wherein the change sequence number is assigned when an entry is modified by a client.

8. A method of generating a change sequence number, comprising:
initializing the change sequence number;
retrieving a timestamp portion, wherein the timestamp portion comprises a network offset component, wherein the network offset component is incremented when a first logical time on a first server is greater than a second logical time on a second server;
retrieving a sequence number portion;
retrieving a replica identifier portion;
retrieving a sub-sequence number portion; and
wherein the timestamp portion, the sequence number portion, the replica identifier portion, and the sub-sequence number portion are joined into a tuple that forms the change sequence number.

9. The method of claim 8, further comprising:
maintaining a highest value of the change sequence number in stable storage.

10. The method of claim 8, wherein the timestamp portion is represented by logical time and is thirty-two bits in length.

11. The method of claim 8, wherein the sequence number portion is generated by an incremental counter and is sixteen bits in length.

12. The method of claim 8, wherein the replica identifier portion denotes an identifier of a server that generated the change sequence number and is sixteen bits in length.

13. The method of claim 8, wherein the sub-sequence number portion is used to order operations within a single operation and is sixteen bits in length.

14. The method of claim 8, wherein the change sequence number is assigned when an entry is modified by a client.

15. An apparatus for generating a change sequence number, comprising:
means for initializing the change sequence number;
means for retrieving a timestamp portion;
means for retrieving a sequence number portion;
means for retrieving a replica identifier portion;
means for retrieving a sub-sequence number portion; and
means for joining the timestamp portion, the sequence number portion, the replica identifier portion, and the sub-sequence portion into a tuple that forms the change sequence number, wherein the timestamp portion comprises a network offset component, wherein the network offset component is incremented when a first logical time on a first server is greater than a second logical time on a second server.

* * * * *

UNITED STATES PATENT AND TRADEMARK OFFICE
CERTIFICATE OF CORRECTION

PATENT NO. : 7,096,236 B1  
APPLICATION NO. : 09/993939  
DATED : August 22, 2006  
INVENTOR(S) : Gordon Good It is certified that error appears in the above-identified patent and that said Letters Patent is hereby corrected as shown below:

On the Title page

Item (75) Inventors, line 3, replace "Ludivoc Poitou" with --Ludovic Poitou--.

Signed and Sealed this

Twenty-sixth Day of December, 2006

JON W. DUDAS  
*Director of the United States Patent and Trademark Office*